Feb. 21, 1967  W. H. PLUMPE, JR  3,305,714
MOTOR-BRAKING DEVICES
Filed Jan. 8, 1964  2 Sheets-Sheet 1

INVENTOR.
WILLIAM HENRY PLUMPE, JR.
BY Alfred W Petchaft
ATTORNEY

INVENTOR.
WILLIAM HENRY PLUMPE, JR.
BY
*Alfred W. Petcheft*
ATTORNEY

United States Patent Office 3,305,714
Patented Feb. 21, 1967

3,305,714
MOTOR-BRAKING DEVICES
William Henry Plumpe, Jr., St. Louis County, Mo., assignor, by mesne assignments, to Brunswick Corporation, a corporation of Delaware
Filed Jan. 8, 1964, Ser. No. 336,498
12 Claims. (Cl. 318—212)

This invention relates in general to certain new and useful improvements in motor-braking devices and, more particularly, to electronic braking devices adapted for use with alternating current motors, and is a further development of my application Serial No. 319,144, filed October 28, 1963.

Many types of machinery which perform intermittent process operations are driven by electrical motors and the sequence of operations, or programming, of the machine will frequently involve the use of switches that are adapted to turn the motor on or off at frequent intervals during a period of operation. In machines of this type, it is usually essential that the prime mover be stopped quickly and precisely, so that there will be no significant over-travel. For example, this problem is particularly acute in the design of servo-mechanisms. Whatever over-travel is encountered is usually corrected by reverse-travel but the corrective reverse-travel itself ordinarily involves another over-travel in the reverse direction and a further correction is required. This effect is termed "hunting" and usually produces errors in the control-function of a servo-system.

Therefore, it is desirable to employ some kind of braking mechanism so that the machinery will stop almost immediately whenever stoppage is required, and over-travel will be eliminated or at least reduced to non-significant proportions. Existing types of braking mechanisms, however, are mechanical in operation and rely upon the inter-engagement of two frictional members, such as a brake-drum and brake band, or a clutch disk and clutch plate. This type of braking device, being essentially mechanical, requires some increment of time in which to function and, therefore, has inherent limitations, so far as accuracy and precision are concerned. Moreover, mechanical braking devices wear rather rapidly and, therefore, require frequent adjustment, maintenance and repair. In addition to this, mechanical braking devices are comparatively large and costly.

There are also many machine tools which must be stopped repeatedly in the course of a particular operation. In such cases, present practice is merely to pull the switch and let the machine coast to a stop. Obviously, at machinist rates of pay, this is a very wasteful procedure, especially in the case of large heavy machinery, which has developed considerable momentum and is carefully designed to reduce friction in the bearings. Such machine tools often require a number of minutes to slow down and stop. Thus, when the work must be frequently measured with a micrometer, or other gauge, as is necessary in close tolerance machining, the frequent stops will add a large percentage of useless time to the job. Very few such machine tools have been built with brakes and, therefore, it is highly desirable to provide a braking mechanism which can be easily applied to existing equipment at reasonable cost.

It is, therefore, the primary object of the present invention to provide an electronic braking device which can be applied to or incorporated in electric motors of any type, having a field winding which utilizes a rotating field for repeatedly stopping such motors.

It is also another object of the present invention to provide an electronic braking device which can be applied to or incorporated in electric motors for repeatedly stopping such motors rapidly, and with a minimum of lost time.

It is another object of the present invention to provide a braking device of the type stated which is relatively simple in construction, and, therefore, economical in initial cost.

It is also an object of the present invention to provide a braking device of the type stated which functions through a minimum of mechanically operated parts or components, is free of wear, thereby eliminating substantially all maintenance and repair costs, and is not subject to ambient conditions such as an explosive atmosphere or a dust-laden atmosphere.

It is a further object of the present invention to provide a braking device of the type stated which is capable of immediate and highly sensitive response to control impulses and, therefore, is capable of extremely precise operation.

It is also an object of the present invention to provide a braking device of the type stated which is unusually compact, light-weight, and, if desired, can be easily applied to an existing motor which either does not have some form of braking device or in which the braking device is not satisfactory.

With the above and other objects in view, my invention resides in the novel features of form, construction, arrangement, and combination of parts presently described and pointed out in the claims.

In the accompanying drawings—

Figure 1:
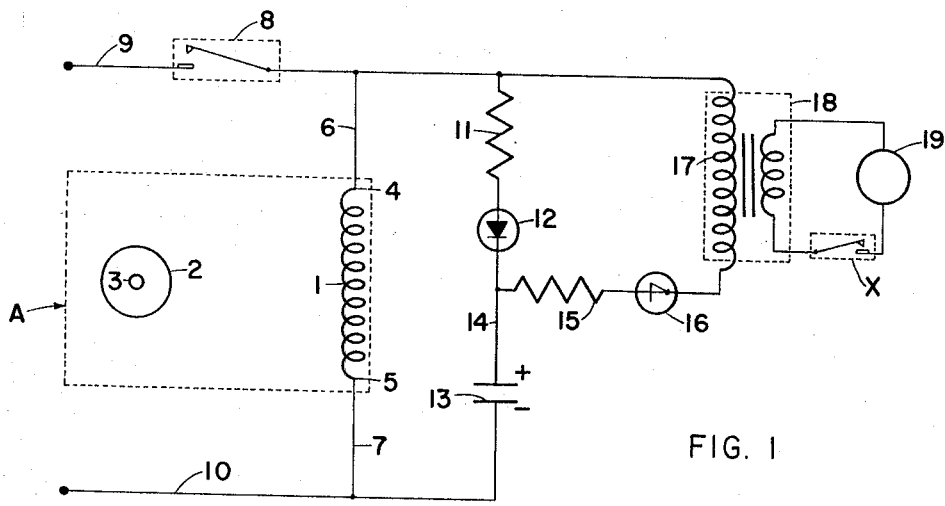
FIG. 1 is a schematic wiring diagram of an electronic braking device constructed in accordance with and embodying the present invention.

Referring now in more detail and by reference characters to the drawings which illustrate practical embodiments of the present invention, A designates an A.C. motor having a field winding 1, a rotor 2 and a drive shaft 3. The field winding 1 has terminals 4, 5, which are electrically connected through conductors 6, 7, and a conventional switch 8 to A.C. supply lines 9, 10, which are, in turn, connected through conventional conductors (not shown) to a conventional source of alternating current. For convenience of illustration, the switch 8 is shown as being interposed in the supply line 9.

Connected in series across the A.C. supply lines 9, 10, is a surge-limiting resistor 11, a diode 12, and a capacitor 13, the diode 12 and capacitor 13 being connected by a conductor 14. Connected to the conductor 14 is one end of a resistor 15 which is connected at its other end to one terminal of a four layer switching diode 16, sometimes called an "avalanche diode," the latter being, in turn, connected to one terminal of the secondary winding 17 of a transformer 18. At its other end, the secondary winding 17 is connected to the line 9. The transformer 18 also has a primary which is connected to an external power source 19 of any conventional type and a control switch X is interposed in one of the leads by which such connection is made. The power source 19 is adapted to supply a positive pulse which exceeds a breakover or threshold voltage of the switching diode 16 and the latter begins to conduct or "fire," so to speak. The polarity of the capacitor 13, as shown in FIG. 1, is, of course, the result of the direction in which the diode 12 is connected. The switch X may be opened mechanically or may be actuated by a conventional electrical device such as a solenoid (not shown) energized by some remote control current such as might be initiated by a photocell.

Assuming that a main switch (not shown) is closed so that the lines 9, 10, are live, and that the switch 8 is also closed, the motor A will be energized and the drive shaft 3 will rotate. As soon as the switch 8 is manually opened, the A.C. supply to the field winding 1 will be cut-off. Meanwhile, however, the A.C. current across the lines 9, 10, will charge up the capacitor 13. When the breakover current is supplied to the primary of the transformer 18 by reason of the closing of the switch X, the capacitor 13 discharges through the switching diode 16 and the accumulated charge thereof flows through the field winding 1 of the motor A. It has been found in connection with the present invention that when a D.C. voltage is discharged through the field winding of an A.C. motor, the motor will stop almost immediately. This can be done because such motors can be momentarily overloaded for a few milliseconds with a relatively high-amperage D.C. current, without damage. By appropriate control of the switch X, it is possible to stop the motor A immediately or to introduce a time-lag of almost any desired duration between the opening of the switch 8 and the firing of the avalanche diode 16.

Figure 2:
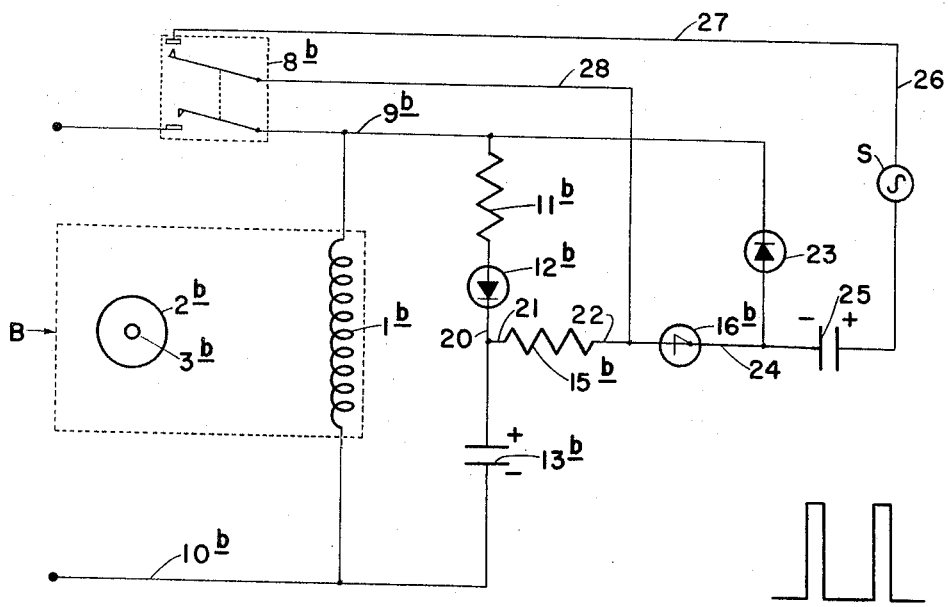
FIG. 2 is a schematic wiring diagram of a modified form of electronic braking device constructed in accordance with and embodying the present invention.

It is also possible to provide a modified form of braking system, as shown in FIG. 2, adapted for use with an electric motor B, which is substantially identical with the previously described electric motor A, and includes a field winding $1^b$, a rotor $2^b$, and a drive shaft $3^b$. In this embodiment of the present invention, one terminal of the field winding $1^b$ is connected through one contactor of a two contactor switch $8^b$ and supply line $9^b$ to one terminal of an A.C. current source (not shown). The circuit also includes a supply line $10^b$ by which the other terminal of the field winding $1^b$ is connected to the other terminal of the A.C. current source. The circuit also includes a resistor $11^b$, diode $12^b$, capacitor $13^b$, resistor $15^b$, and switching diode $16^b$, which are similar in function to the previously described resistor 11, diode 12, capacitor 13, resistor 15, and switching diode 16. The diode $12^b$ is connected by a conductor 20 to the capacitor $13^b$. Similarly, the resistor $15^b$ is connected by one lead 21 to the conductor 20 between the diode $12^b$ and capacitor $13^b$. The resistor $15^b$ is also connected by another lead 22 to the switching diode $16^b$. Instead of the previously described transformer 18, however, this particular circuit includes a diode 23 which is connected across the line $9^b$ and the lead 24 from the switching diode $16^b$. This circuit also includes a capacitor 25 which is connected between the lead 24 and one lead 26 of a conventional square wave signal source S. The other lead 27 from the signal source S is connected through the switch $8^b$ and the conductor 28 to the lead 22 between the resistor $15^b$ and the switching diode $16^b$.

This circuit, as shown in FIG. 2, operates substantially in the same manner as the previously described circuit shown in FIG. 1, except that the additional pole and blade of switch $8^b$ are used instead of the previously described switch X. Moreover, the diode 23 prevents the breakover voltage from circulating throughout the entire circuit and confines it to the avalanche or switching diode $16^b$.

Figure 3:
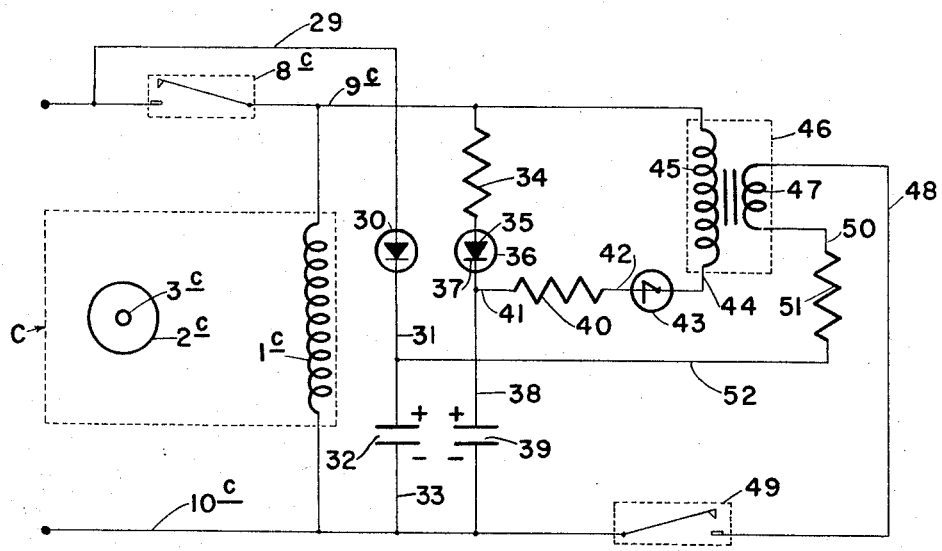
FIG. 3 is a schematic wiring diagram of another modified form of electronic braking device constructed in accordance with and embodying the present invention.

It is also possible to provide an electric braking device of the type shown in FIG. 3 which is similar to that shown in FIG. 1 and is adapted for use with an A.C. motor C having a field winding $1^c$, a rotor $2^c$, and a shaft $3^c$. In this embodiment of the present invention, one terminal of the field winding $1^c$ is connected to a supply line $9^c$ which is, in turn, connected through the switch $8^c$ to one terminal of an A.C. current source (not shown). The circuit also includes a supply line $10^c$ which is connected to the other terminal of the A.C. current source.

For clarity of illustration, the switch $8^c$ is shown as a simple hand-operated switch, but, it should be understood that a mechanical, electrical or electronic switching device may be substituted for the switch $8^c$ whereby the A.C. current to the motor C can be interrupted in response to some remotely generated electrical signal or remotely initiated mechanical movement.

Connected on the so-called "hot" side of the switch $8^c$ is a conductor 29 which is connected to the anode of a diode 30. The cathode of diode 30 is connected by a conductor 31 to the positive plate of a capacitor 32, the negative plate of which is connected by a conductor 33 directly to the supply line $10^c$.

Connected at one end directly to the line $9^c$ is a surge-limiting resistor 34 which is also connected at its other end to the anode 35 of a diode 36. The cathode 37 of the diode 36 is connected by a conductor 38 to the positive plate of a capacitor 39, the negative plate of which is connected directly to the line $10^c$. The circuit also includes a resistor 40 connected at one end by a lead 41 to the conductor 38 and at the other end by a lead 42 of a switching diode 43, which is, in turn, connected by a lead 44 to one end of a secondary winding 45 forming part of a transformer 46. The other end of the secondary winding 45 is connected to the line $9^c$.

The transformer 46 also includes a primary winding 47, one end of which is connected by a lead 48 and a control switch 49 to the line $10^c$. The other end of the primary winding 47 is connected by a lead 50 to a resistor 51, the latter being, in turn, connected by a lead 52 to the conductor 31.

The electronic braking device shown in FIG. 3 functions basically in the same manner as the previously described embodiments, but is particularly suited for application where precise stopping of process machinery is required, such as would be true in a cut-off machine, for example. When the switch $8^c$ is opened, the field winding $1^c$ of the motor C will become de-energized and the rotor $2^c$ will start coasting to a stop. Thereupon, at some selected moment in the operation-cycle of the machinery being driven by the motor C, the switch 49 may be opened to the position shown in FIG. 3 and immediately a positive pulse, which exceeds the breakover or threshold voltage of the switching diode 43, is delivered to the diode 43, and the latter begins to conduct so that the D.C. charge accumulated in the capacitor 39 will be discharged through the field winding $1^c$, bringing the motor C to a precise stop. Actually, the switching diode 43 can be made to fire either on "make" or "break" of the switch 49, depending upon the way in which the transformer leads are hooked up. As shown in FIG. 3, it is presumed that the primary winding 47 and secondary winding 45 are in phase and the switching diode 43 will fire when the switch 49 opens.

Figure 4:
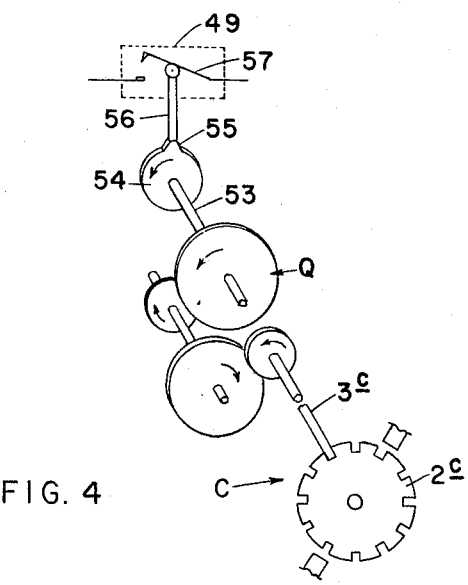
FIG. 4 is a schematic perspective view illustrating one form of mechanical component with which a motor braking system of the present invention can be used.

In actual practice, the shaft $3^c$ will ordinarily be connected to a conventional speed-reduction gear train, such as that schematically shown at G in FIG. 4. This gear train G will include an output shaft 53 which is ultimately connected in some simple mechanical manner to the machinery which is being driven by the motor C, and mounted upon such output shaft 53 is a cam 54 having a lobe 55. The cam 54 bears operatively against one end of an actuator rod 56, which is operatively connected to the blade 57 of the switch 49. Thus, when the lobe 55 lifts the actuator rod 56, the switch blade 57 will be shifted to circuit-open position. If, for example, the gear ratio of the gear train G is 30 to 1, then an arcuate movement of 30° in the rotor $2^c$ will actually only amount to one degree of arcuate movement of the shaft 53, so that the possible error will always be substantially less than one percent. The cam 54 merely represents one preferred mechanism by which the switch 49 can be closed at some selected moment in the operation cycle of the machinery being driven upon the motor C. Any other equivalent mechanism for closing the switch 49 can also be employed.

It should be understood that changes and modifications in the form, construction, arrangement, and combination of the several parts of the motor-braking devices may be made and substituted for those herein shown and described without departing from the nature and principle of my invention.

Having thus described my invention, what I claim and desire to secure by Letters Patent is:

1. A braking device for use with an alternating-current motor having a field winding, said device comprising a source of alternating current to supply power to the motor, means for interrupting the flow of alternating current to the motor, a source of direct current including a capacitor connected in parallel across the field winding of the motor, rectifier means in series with the capacitor for charging said capacitor from the source of alternating current, a two terminal switching diode of the avalanche type interposed between the capacitor and the field winding for normally blocking the flow of direct current to the field winding, means operable responsive to interruption of the flow of alternating current to said motor for causing the switching diode to become conductive thereby transmitting a direct-current impulse from the capacitor to the motor thereby causing the motor to stop.

2. A braking device according to claim 1 in which the switching diode is triggered by current supplied from a second diode-capacitor network.

3. A braking device according to claim 1 in which the switching diode is triggered by current supplied from a transformer.

4. Apparatus for braking an alternating current motor, comprising: a source of alternating current connected across the motor; means for interrupting the flow of alternating current from said source to said motor; a source of direct current; an avalanche device having only two operative electrodes switchable from a nonconductive to a conductive state when the potential across the electrodes exceeds a break-over value; network means connecting said electrodes, said direct current source, and said motor in circuit; and means for generating a break-over potential coupled to said electrodes when the flow of alternating current is interrupted, thereby switching said device to brake said motor.

5. The apparatus of claim 4 wherein said generating means includes a tranformer having a secondary winding developing the break-over potential thereacross, and means connecting said secondary winding in circuit with said electrodes.

6. The apparatus of claim 5 wherein said network means includes a return path for the break-over potential which prevents said potential from being impressed across said motor.

7. The apparatus of claim 5 wherein said generating means further includes a capacitor and a diode connected across the alternating current source, and switch means connecting the capacitor to a primary winding of said transformer, the actuation of the switch creating a pulse which switches said device.

8. Apparatus for braking an alternating current motor, comprising: a source of alternating current connected across the motor; means for interrupting the flow of alternating current from said source to said motor; means connecting a diode and a capacitor to the alternating current source, said diode causing the capacitor to charge; a two terminal avalanche device switchable from a nonconductive to a conductive state when the potential thereacross exceeds a break-over value; means for generating a break-over potential when the flow of alternating current is interrupted; and means including a first network for connecting said device, said capacitor, and said motor in circuit and a second network for connecting said generating means and said device in circuit.

9. The apparatus of claim 8 wherein said second network completes an electrical path for the break-over potential, said path being mutually exclusive of said motor and said capacitor.

10. The apparatus of claim 9 wherein said diode forms at least a part of the electrical path for said second network.

11. The apparatus of claim 9 wherein said electrical path is also mutually exclusive of said diode.

12. The apparatus of claim 11 wherein said generating means comprises a square wave signal source, and said second network including said electrical path comprises in series said square wave signal source, a second capacitor, said device, and a normally open switch, the closing of said switch creating said break-over potential which switches said device.

References Cited by the Examiner

UNITED STATES PATENTS

| 2,428,390 | 10/1947 | Smith | 320—1 |
| 2,512,354 | 6/1950 | Marbury | 318—212 |
| 2,519,043 | 8/1950 | Greenwood | 318—212 |
| 2,767,362 | 10/1956 | Beaubien | 318—212 |
| 2,812,484 | 11/1957 | Westfelt | 318—266 |
| 2,818,539 | 12/1957 | Johnson | 318—212 X |

OTHER REFERENCES

General Electric Controlled Rectifier Manual, first edition, March 21, 1960, page 75.

ORIS L. RADER, *Primary Examiner.*

G. FRIEDBERG, G. Z. RUBINSON,
*Assistant Examiners.*